United States Patent
Liu et al.

(10) Patent No.: US 12,072,433 B2
(45) Date of Patent: Aug. 27, 2024

(54) RADAR INTERFERENCE MITIGATION USING SIGNAL PATTERN MATCHING

(71) Applicant: Aptiv Technologies AG, Schaffhausen (CH)

(72) Inventors: Baokun Liu, Kokomo, IN (US); James Fredrick Searcy, Westfield, IN (US); Benjamin Dilsaver, Kokomo, IN (US)

(73) Assignee: Aptiv Technologies AG, Schaffhausen (CH)

( * ) Notice: Subject to any disclaimer, the term of this patent is extended or adjusted under 35 U.S.C. 154(b) by 376 days.

(21) Appl. No.: 17/479,363

(22) Filed: Sep. 20, 2021

(65) Prior Publication Data

US 2022/0404455 A1    Dec. 22, 2022

Related U.S. Application Data

(60) Provisional application No. 63/212,982, filed on Jun. 21, 2021.

(51) Int. Cl.
*G01S 7/02* (2006.01)
*G01S 7/292* (2006.01)
(Continued)

(52) U.S. Cl.
CPC ............ *G01S 7/023* (2013.01); *G01S 7/2927* (2013.01); *G01S 7/4008* (2013.01); *G01S 13/66* (2013.01); *G01S 13/931* (2013.01)

(58) Field of Classification Search
CPC ...... G01S 7/023; G01S 7/2927; G01S 7/4008; G01S 13/66; G01S 13/931; H04W 72/0406; H04W 72/082
See application file for complete search history.

(56) References Cited

U.S. PATENT DOCUMENTS

2010/0019950 A1   1/2010   Yamano et al.
2013/0342381 A1   12/2013  Nakagawa et al.
(Continued)

FOREIGN PATENT DOCUMENTS

EP    3244229 A1   11/2017
EP    3637127 A1   4/2020
(Continued)

OTHER PUBLICATIONS

"Extended European Search Report", EP Application No. 22167526.7, Oct. 17, 2022, 18 pages.
(Continued)

*Primary Examiner* — Vladimir Magloire
*Assistant Examiner* — Maxine McKenzie Phillips
(74) *Attorney, Agent, or Firm* — Harness, Dickey & Pierce, P.L.C.

(57) ABSTRACT

This document describes techniques, apparatuses, and systems for radar interference mitigation using signal pattern matching. Radar signals (e.g., chirps) received by a radar system may include interference from other nearby radar systems. The interference can result in reduced sensitivity of the radar system. The techniques, apparatuses, and systems described herein mitigate the interference by selecting an uncorrupted segment of the radar signal that neighbors a corrupted segment, analyzing the radar signal to identify a match segment that has similar signal characteristics to the neighbor segment, and replacing the corrupted segment with a segment that is adjacent to the match segment. In this manner, a noise floor of the radar system may be lowered, leading to increased sensitivity.

22 Claims, 6 Drawing Sheets

(51) Int. Cl.
*G01S 7/40* (2006.01)
*G01S 13/66* (2006.01)
*G01S 13/931* (2020.01)

(56) References Cited

U.S. PATENT DOCUMENTS

| | | |
|---|---|---|
| 2013/0342383 A1 | 12/2013 | Kojima |
| 2017/0059691 A1 | 3/2017 | Fischer |
| 2019/0317187 A1 | 10/2019 | Meissner et al. |
| 2020/0191911 A1* | 6/2020 | Meissner .............. G01S 13/343 |
| 2020/0292660 A1 | 9/2020 | Meissner et al. |

FOREIGN PATENT DOCUMENTS

| | | |
|---|---|---|
| EP | 3770628 A1 | 1/2021 |
| EP | 3828585 A1 | 6/2021 |
| JP | 2014224694 A * | 12/2014 |
| JP | 7349311 B2 * | 9/2023 ............ G01S 13/32 |
| WO | 2019159112 A1 | 8/2019 |

OTHER PUBLICATIONS

Brooker, "Mutual Interference of Millimeter-Wave Radar Systems", Feb. 2007, pp. 170-181.
Toth, et al., "Performance Comparison of Mutual Automotive Radar Interference Mitigation Algorithms", Apr. 2019, 6 pages.
Tullsson, "Topics in FMCW radar disturbance suppression", Oct. 1997, 5 pages.
"Extended European Search Report", EP Application No. 22197774.7, Mar. 31, 2023, 13 pages.
Alhumaidi, et al., "Interference Avoidance and Mitigation in Automotive Radar", Jan. 2021, pp. 172-175.

* cited by examiner

RADAR INTERFERENCE MITIGATION USING SIGNAL PATTERN MATCHING

CROSS-REFERENCE TO RELATED APPLICATION

This application claims the benefit under 35 U.S.C. 119(e) of U.S. Provisional Application No. 63/212,982, filed Jun. 21, 2021, the disclosure of which is incorporated by reference in its entirety herein.

BACKGROUND

Radar systems can provide range, velocity, and azimuth angle information of objects in the surrounding environment of vehicles equipped with perception systems, including autonomous or semi-autonomous driving systems. The object information is used to provide features such as adaptive cruise control, lane-centering, lane-change assist, and emergency braking. With radar equipped vehicles becoming more common, the presence of radar interference may hinder radar performance. This radar interference may elevate a noise floor during signal processing, which can result in unreliable object detection and tracking.

SUMMARY

This document describes techniques, apparatuses, and systems for radar interference mitigation using signal pattern matching. Radar signals (e.g., chirps) received by a radar system may include interference from other nearby radar systems. The interference can result in reduced sensitivity of the radar system. The techniques, apparatuses, and systems described herein mitigate the interference by selecting an uncorrupted segment of the radar signal that neighbors a corrupted segment, analyzing the radar signal to identify a match segment that has similar signal characteristics to the neighbor segment, and replacing the corrupted segment with a segment that is adjacent to the match segment. In this manner, a noise floor of the radar system may be lowered, leading to increased sensitivity.

In one example, a method includes determining, by a processor of a radar system, that interference is present in a radar signal. Prior to generating radar data based on the radar signal, the method includes mitigating the interference by performing a series of operations. The operations include identifying a corrupted segment of the radar signal that corresponds to the interference. The operations further include determining a neighbor segment of the radar signal that is adjacent to the corrupted segment and determining a match segment of the radar signal with similar signal characteristics as the neighbor segment. The operations further include determining a replacement segment of the radar signal that is adjacent to the match segment and adjusting, based on signal characteristics of the replacement segment, signal characteristics of the corrupted segment of the radar signal to generate a mitigated radar signal without the interference. The method further includes generating, based on the mitigated radar signal, the radar data. The method further includes outputting the radar data for at least detecting or tracking of objects in an environment of the radar system.

In another example, a system includes a processor configured to perform this and other methods. This document also describes a computer-readable storage medium comprising instructions that, when executed, configure at least one processor to perform the above-summarized method and other methods set forth herein, in addition to describing systems configured to perform the above-summarized method and the other methods set forth herein.

This Summary introduces simplified concepts related to radar interference mitigation using signal pattern matching, further described in the Detailed Description and Drawings. This Summary is not intended to identify essential features of the claimed subject matter, nor is it intended for use in determining the scope of the claimed subject matter. That is, one problem solved by the described techniques is mitigating radar interference among vehicles, which cause false detections or low sensitivity. Other interference mitigation techniques may overload processing resources or otherwise be too complex for driving applications. Therefore, although primarily described in the context of improving radar signal processing of an automotive vehicle, radar interference mitigation using signal pattern matching can be applied to other real-time applications where robustness from interference and increased sensitivity of a radar system is desired.

BRIEF DESCRIPTION OF THE DRAWINGS

The details of one or more aspects of radar interference mitigation using signal pattern matching are described in this document with reference to the following figures.

DETAILED DESCRIPTION

Overview

Figure 1:
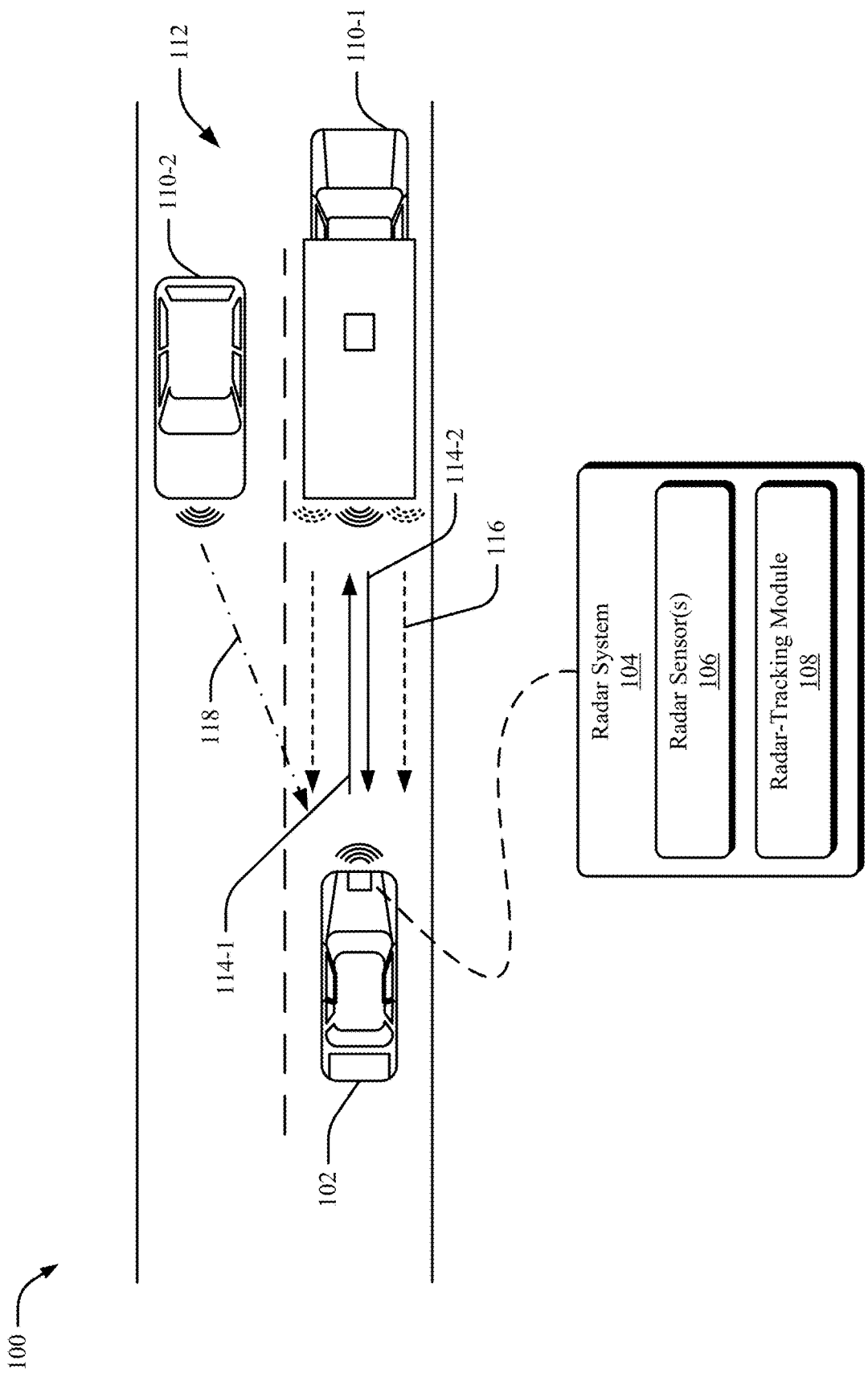
FIG. 1 illustrates an example environment in which radar interference mitigation using signal pattern matching can be applied, in accordance with techniques of this disclosure.

Vehicles equipped with autonomous, semi-autonomous, or other driving systems address radar interference in various ways. Several interference-mitigation techniques exist, including zero forcing, clipping, time domain parametric interpolation, and iteratively applying adaptive thresholding, but these techniques have had limited success. These techniques often come with drawbacks, including false detections, lower sensitivity of the radar system, or an increase in the processing burden of the radar system.

For a radar signal that is corrupted due to interference, zero-forcing sets a magnitude of samples within segments of the signal to zero to eliminate the interference. However, applying a zero magnitude to segments in the samples introduces a gap in the signal. During further radar processing, this gap may introduce spectrum-spreading around strong targets and cause a radar system to introduce false detections, which may increase the processing burden of the radar system.

Clipping a radar signal includes setting an amplitude of a corrupted segment of the radar signal to be above or below a predetermined threshold. Although this may suppress the interference, the interference remains present in the signal. The insufficient removal of radar interference can lead to false detections and can cause worse sensitivity than through zero-forcing.

In time domain parametric interpolation, a parametric prediction model executes to reconstruct corrupted segments into usable radar samples. Selecting model parameters is difficult, however, and inaccurate model parameter selections can likewise lead to worse performance than through zero-forcing.

Iteratively applying adaptive thresholding addresses interference by replacing corrupted segments through applying an iterative fast Fourier transform. This can be effective in mitigating interference, but without overloading computing resources this technique can be too complex to implement for supporting real time applications.

In contrast to the techniques described above, radar interference mitigation using signal pattern matching, as described herein, is a more effective and efficient technique to mitigate interference present in a radar signal. The techniques described herein overcome disadvantages of other techniques by reconstructing the corrupted segments using pattern matching, which preserves accuracy of information in a radar signal, and does so without overloading or necessitating additional computing resources.

In a frequency modulated continuous wave (FMCW) radar system, a difference in time between a transmitted chirp and a reflected chirp is referred to as a beat signal (or beat frequency). The beat signal may not be strictly periodic within a single chirp duration, but it may be assumed to be a quasi-periodic signal with a fundamental frequency and dominant frequencies that can be estimated by an autocorrelation function. If the fundamental frequency is not less than two times of the frequency resolution, the quasi-periodic signal can go through at least two approximately identical cycles in one chirp duration. This implicates that the chirp may contain a candidate replacement segment that can effectively replace the corrupted segment.

The techniques described herein identify the candidate replacement segment by analyzing a segment of the radar signal that is adjacent to (e.g., a neighbor segment) the corrupted segment. The candidate replacement segment is selected by locating a match segment that has similar signal characteristics as the neighbor segment that is adjacent to the corrupted segment. The corrupted segment can be replaced with the candidate replacement segment. In some aspects, the replacement of the corrupted segment with the candidate replacement segment occurs if the signal characteristics of the neighbor segment and the match segment have a correlation above a threshold. These techniques may be advantageous over other techniques by maintaining a lower noise floor for the radar signal that results in an increase in radar system sensitivity without increasing computational complexity.

Example Environment

FIG. 1 illustrates an example environment 100 in which radar interference mitigation using signal pattern matching can be applied, in accordance with techniques of this disclosure. A vehicle 102 is equipped with a radar system 104 configured for radar interference mitigation using signal pattern matching. Although depicted as a car, the vehicle 102 can represent other types of vehicles and machinery (e.g., a motorcycle, a bus, a tractor, a semi-trailer truck, watercraft, aircraft, other heavy equipment), including manned and unmanned systems that may be used for a variety of purposes.

The radar system 104 may include one or more radar sensors 106 and a radar-tracking module 108. With the radar sensors 106 specifically located on the vehicle 102, the radar system 104 provides an instrument field-of-view (FOV) that may encompass one or more vehicles 110, including vehicle 110-1 and vehicle 110-2. For example, positioning the radar sensors 106 together can ensure the FOV includes areas above, adjacent to, or on a road 112 on which the vehicle 102 may be traveling. The radar sensors 106 can capture signals from any position on the vehicle 102, including behind or integrated into a side mirror, bumper, roof, or any other part of the vehicle 102, to obtain the desired FOV.

With the radar-tracking module 108, the radar system 104 is configured to detect other vehicles, pedestrians, or other objects traveling on or near the road 112. The radar-tracking module 108 correlates transmitted radar signals 114-1 to received radar signals 114-2 (e.g., chirps) that reflect off a surface of an object, such as the vehicle 110-1. Within the environment 100, other objects may be using radar, including the vehicles 110-1 and 110-2, which may be transmitting radar signals 116 and 118, respectively. The radar system 104 may detect interference to the radar signals 114-2 caused by the radar signals 116 and 118. If relied on for tracking, the interference may cause the radar-tracking module 108 to have difficult tracking and may report inaccurate results.

The radar-tracking module 108 is configured to enable the radar system 104 to mitigate radar interference using signal pattern matching. The radar-tracking module 108 may generate a beat frequency signal by mixing the transmitted radar signals 114-1 and the received radar signals 114-2. The radar-tracking module 108 may select an uncorrupted segment of the beat frequency signal that neighbors a corrupted segment of the beat frequency signal. Through analyzing the beat frequency signal, the radar-tracking module 108 can search for and identify a match segment of the beat frequency signal that has similar signal characteristics to the uncorrupted segment, and replacing the corrupted segment with a candidate replacement segment that is adjacent to the match segment. In this manner, the beat frequency signal is more accurately approximated despite the interference, and a noise floor of the radar system 104 may be lowered, which can lead to increased sensitivity and ability to perform more accurate radar tracking from information in the beat frequency signal.

Example System

Figure 2:
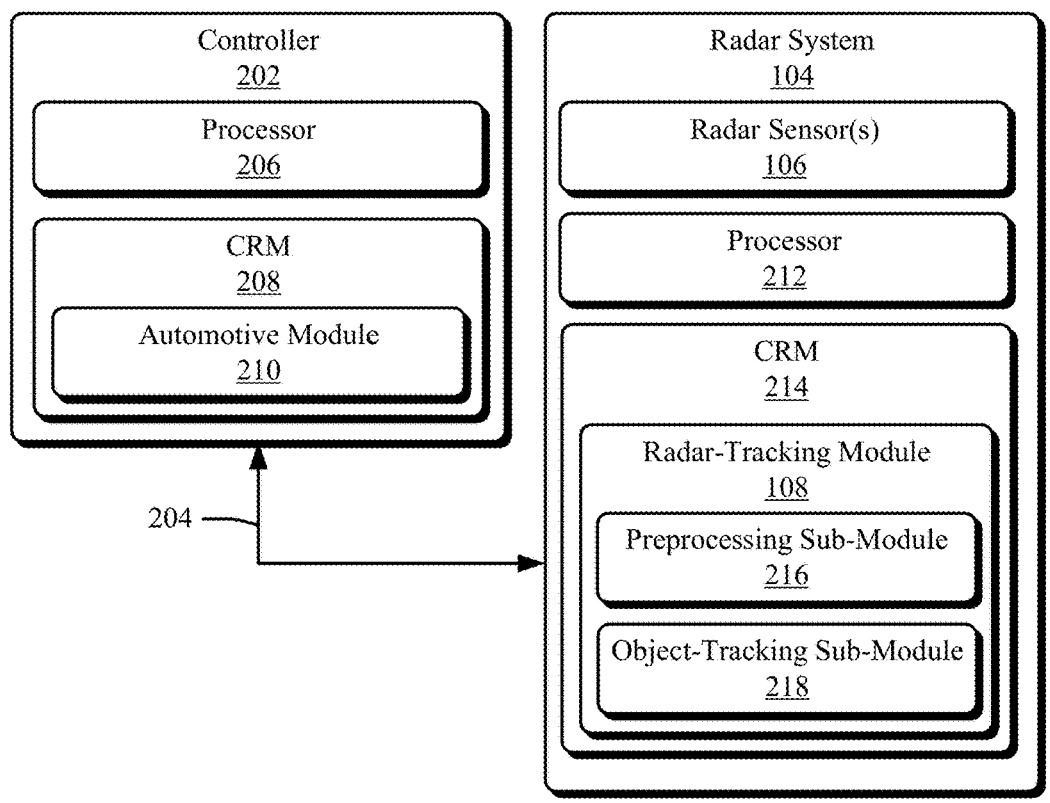
FIG. 2 illustrates an example of an automotive system configured to perform radar interference mitigation using signal pattern matching, in accordance with techniques of this disclosure.

FIG. 2 illustrates an example of an automotive system 200 configured to perform radar interference mitigation using signal pattern matching, in accordance with techniques of this disclosure. The automotive system 200 can be integrated within the vehicle 102 shown in FIG. 1 and is described in that context. For example, the automotive system 200 can include a controller 202 and the radar system 104. The radar system 104 and the controller 202 communicate over a link 204. The link 204 may be a wired or wireless link and, in some cases, includes a communication bus. The controller 202 performs operations based on information received over the link 204, such as an indication of one or more objects traveling on the road 112 from the radar system 104 as objects in the FOV are identified from processing the radar signals 114-2.

The controller 202 includes a processor 206 and a computer-readable storage medium (CRM) 208 (e.g., a memory, long-term storage, short-term storage), which stores instructions for an automotive module 210. The radar system 104 includes the one or more radar sensors 106. The radar system 104 may include processing hardware that includes one or more processors 212 (e.g., a hardware processor, a processing unit) and a CRM 214. The CRM 214 stores instructions associated with the radar-tracking module 108, which may include instructions associated with a preprocessing sub-module 216 and an object-tracking sub-module 218.

The processors 206 and 212 can be two separate or a single processing unit (e.g., microprocessor, multiple processors in a processing unit) or a pair of or a single system-on-chip of a computing device, a controller, or a control unit. The processors 206 and 212 execute computer-executable instructions stored within the CRMs 208 and 214. As an example, the processor 206 can execute the automotive module 210 to perform a driving function (e.g., an autonomous lane change maneuver, a semi-autonomous lane-keep feature) or other operation of the automotive system 200. Similarly, the processor 212 can execute the radar-tracking module 108, including, executing instructions for implementing the preprocessing sub-module 216.

The preprocessing sub-module 216 configures the radar-tracking module 108 to mitigate interference present in the radar signals 114-2 obtained from the radar sensors 106 of the vehicle 102. The preprocessing sub-module 216 may modify the radar signals 114-2 before the radar-tracking module 108 can use the radar signals 114-2 to detect objects or perform tracking.

The object-tracking sub-module 218 receives the output from the preprocessing sub-module 218 and enables the radar-tracking module 108 to infer objects in the FOV based on the preprocessed versions of the radar signals 114-2 provided by the preprocessing sub-module 216. in response to the object-tracking sub-module 218 detecting and tracking objects determined from these preprocessed versions of the radar signals 114-2, an indication of one or more objects detected by the object-tracking sub-module 218 is output from the radar-tracking module 108

Generally, the automotive system 200 executes the automotive module 210 to perform an automotive function, which may include using output from the radar system 104. The automotive module 210, when executing at the processor 206, can receive the indication of the objects detected by the object-tracking sub-module 218 to enable one or more of these automotive functions.

For example, the automotive module 210 can provide automatic cruise control and monitor the radar system 104 for output that indicates the presence of objects in or near the FOV, for instance, to slow the speed and prevent a rear-end collision with the vehicle 110-1. In such an example, the object-tracking sub-module 218 provides radar-based data as output to the automotive module 210. The radar data is indicative of objects detected or tracked from the preprocessed radar signals 114-2, rather than being based on the radar signals 114-2 as initially received at an antenna of the radar system 104.

The automotive module 210 may provide alerts or perform a specific maneuver when the interference-mitigated radar data obtained from the object-tracking sub-module 218 indicates that one or more objects are in a collision zone around the vehicle 102. By using the preprocessed radar signals 114-2 obtained from the preprocessing sub-module 216, the object-tracking sub-module 218 may more-accurately detect objects in the collision zone and within the FOV, which may reduce false detections from propagating as misidentified objects resulting from radar interference in a noisy environment, such as a driving scenario with other vehicles operating their own on-board radar systems.

Example Implementations

Figure 3:
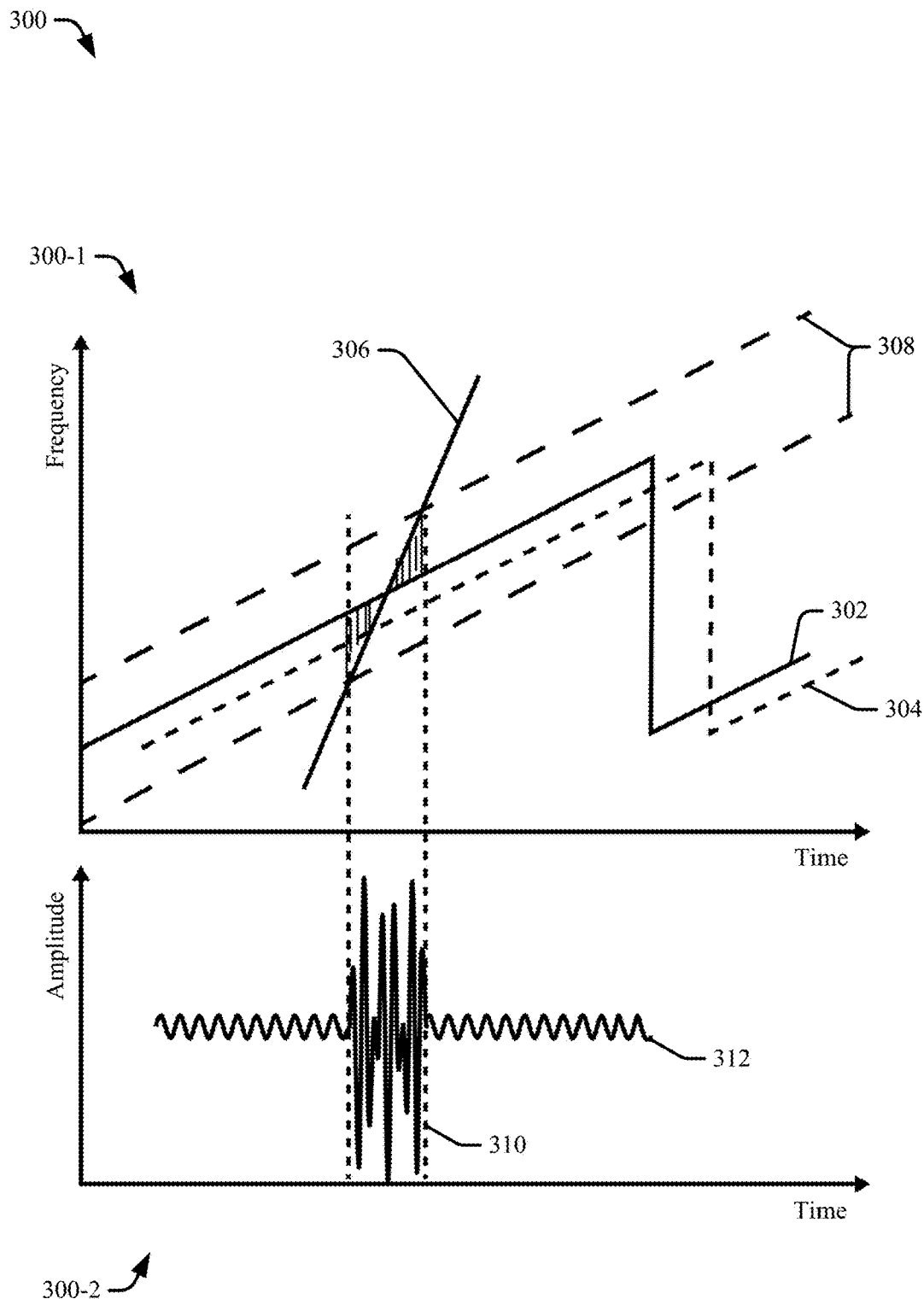
FIG. 3 illustrates an example graph of interference in which radar interference mitigation using signal pattern matching may be applied, in accordance with techniques of this disclosure.

FIG. 3 illustrates example graphs 300 of interference in which radar interference mitigation using signal pattern matching may be applied, in accordance with techniques of this disclosure. The graph 300-1 has dimensions of frequency over time and illustrates a transmitted chirp 302, a received chirp 304, an interfering chirp 306, and interference band limits 308.

In this example, the transmitted chirp 302 is the transmitted signal 114-1 and the received chirp 304 is the received signals 114-2. The transmitted chirp 302 is transmitted by the radar system 104 and reflected off an object is the received chirp 304 received by the radar system 104. As this process occurs, chirps from other radar systems in the same environment as the radar system 104 (e.g., other radar systems associated with the vehicle 110-1 and the vehicle 110-2 in the environment 100), may interfere with the transmitted and received chirps 302 and 304, respectively. This interference may appear as interfering chirp 306 due to the radar signals 116 or 118, which is shown within the interference band limits 308. As illustrated in graph 300-2 in the dimensions of amplitude over time, once the transmitted chirp 302 and the received chirp 304 are down-converted, the interfering chirp 306 may appear as interference 310 on a beat signal 312.

Left unmitigated, this interference 310 can raise the noise floor and reduce the sensitivity of the radar system 104. For example, when considered in the context of FIGS. 1 and 2, if the chirp 304 and the received signal 114-2 originally captured by the radar system 104 is used for object detection and tracking, the radar system 104 may report objects in the environment 100 that include some false detections, or fail to report some detections hidden by a raised-noise floor.

Figure 4:
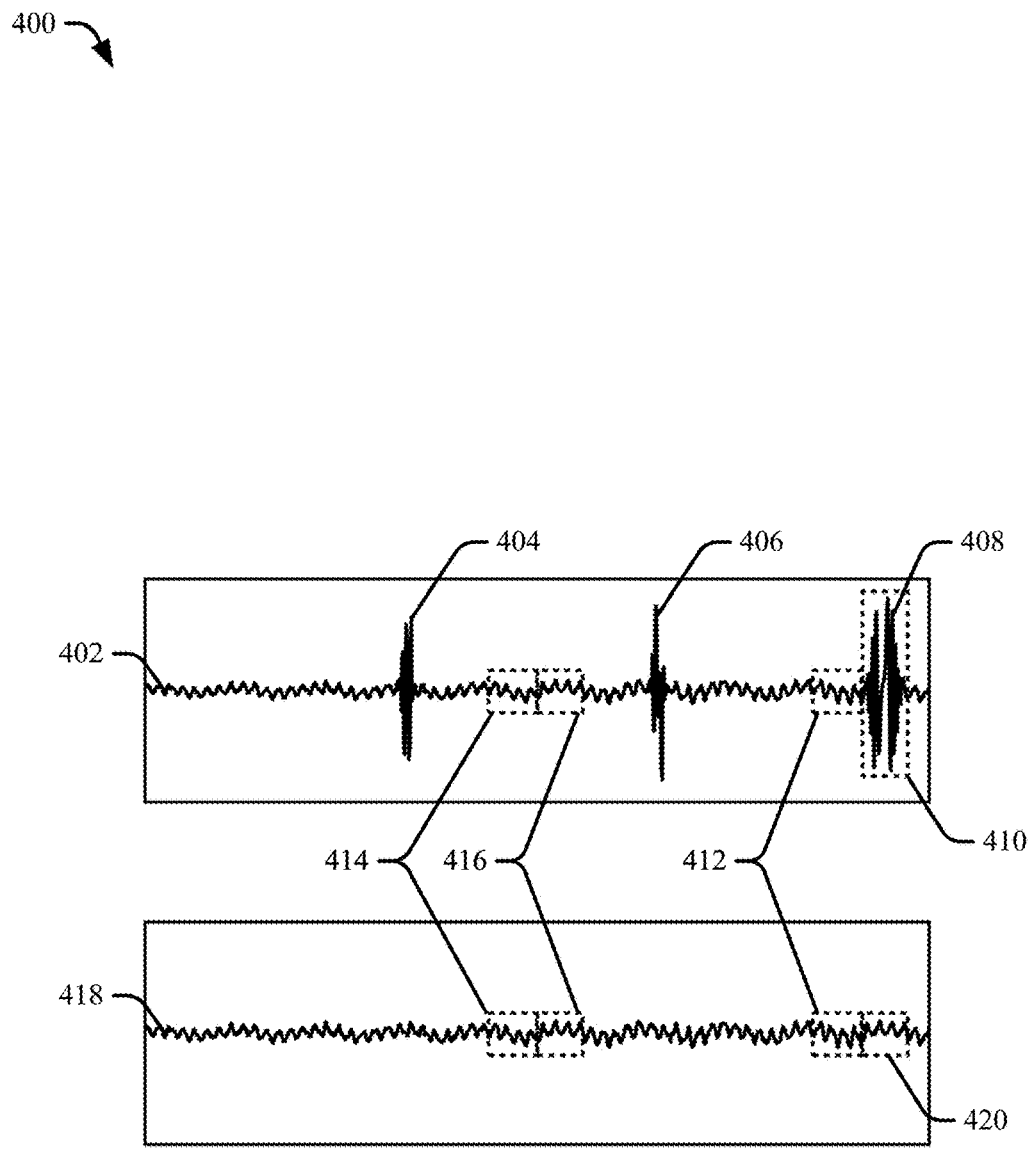
FIG. 4 illustrates an example of a radar signal with interference being mitigated by radar interference mitigation using signal pattern matching, in accordance with techniques of this disclosure.

FIG. 4 illustrates an example 400 of a radar signal with interference being mitigated by radar interference mitigation using signal pattern matching, in accordance with techniques of this disclosure. In continuing from FIG. 3, rather than leave the interfering chirp 306 untreated as described above, the radar tracking module 108 enables the radar system 104 to mitigate this type of interference, and avoid increasing the noise floor to report accurate radar data as a result.

In the example 400, the radar signals 114-2 (e.g., a single chirp) has been down-converted and sampled, and a resulting beat signal 402 includes three interference bursts 404, 406, and 408. Generally, all three interference bursts 404 to 408 may be mitigated, but for simplicity, only the interference burst 408 is discussed. During preprocessing by the preprocessing sub-module 216, a corrupted segment 410 of the beat signal 402 is identified as the interference burst 408. In some aspects, the corrupted segment 410 is determined by the preprocessing sub-module 216 applying adaptive thresholding over the amplitude or squared amplitude of the beat signal 402 to determine a threshold. Segments with an amplitude greater than the threshold may be identified as being interference.

The preprocessing sub-module 216 may determine a neighbor segment 412 that is adjacent or next to the corrupted segment 410. The neighbor segment 412 is adjacent to the corrupted segment 410 in a time domain, for example, the neighbor segment may either precede or follow the corrupted segment 410. In the example 400, the neighbor segment 412 precedes the corrupted segment 410. The length of the neighbor segment 412 can be obtained through a data-trained model executed within the preprocessing sub-module 216. The data-trained model may be programmed to analyze parts of the radar signal 114-2 that immediately precede and immediately follow the corrupted segment 410. Once the neighbor segment 412 is determined, the beat signal 402 is analyzed to match a pattern in another segment of the beat signal 402 that correlates to the neighbor segment 412. A mean absolute error, a correlation coefficient, or some other process may be used to match the pattern. In the example 400, the matching pattern of the neighbor segment is determined to be match segment 414. Once the match segment 414 is determined, a replacement segment 416 is identified. Just as the neighbor segment 412 precedes the corrupted segment 410, the match segment 414 precedes the replacement segment 416. Alternatively, if the neighbor segment 412 followed the corrupted segment 410, the match segment 414 would follow the replacement segment 416.

If the match segment 414 is highly correlated to the neighbor segment 412, that is, if the correlation coefficient between the neighbor segment 412 and the match segment 414 is above a threshold (e.g., a threshold determined through data training), then the replacement segment 416 may be used to replace the corrupted segment 410. In the example 400, a modified beat signal 418 is generated by the preprocessing sub-module 216. The modified beat signal 418 is output to the object-tracking sub-module 218, and includes a segment 420 wherein the samples from replacement segment 416 have replaced the samples in the corrupted segment 410. In the modified beat signal 418, it is assumed that corrupted segments of the interference bursts 404 and 406 have also been replaced. The modified beat signal 418 may represent the mitigated beat signal 402 and can be received by the object-tracking sub-module 218 so that the radar data output from the radar system 104 reflects an increase in sensitivity (e.g., a lower noise floor) with robustness against interference and noise.

Figure 5:
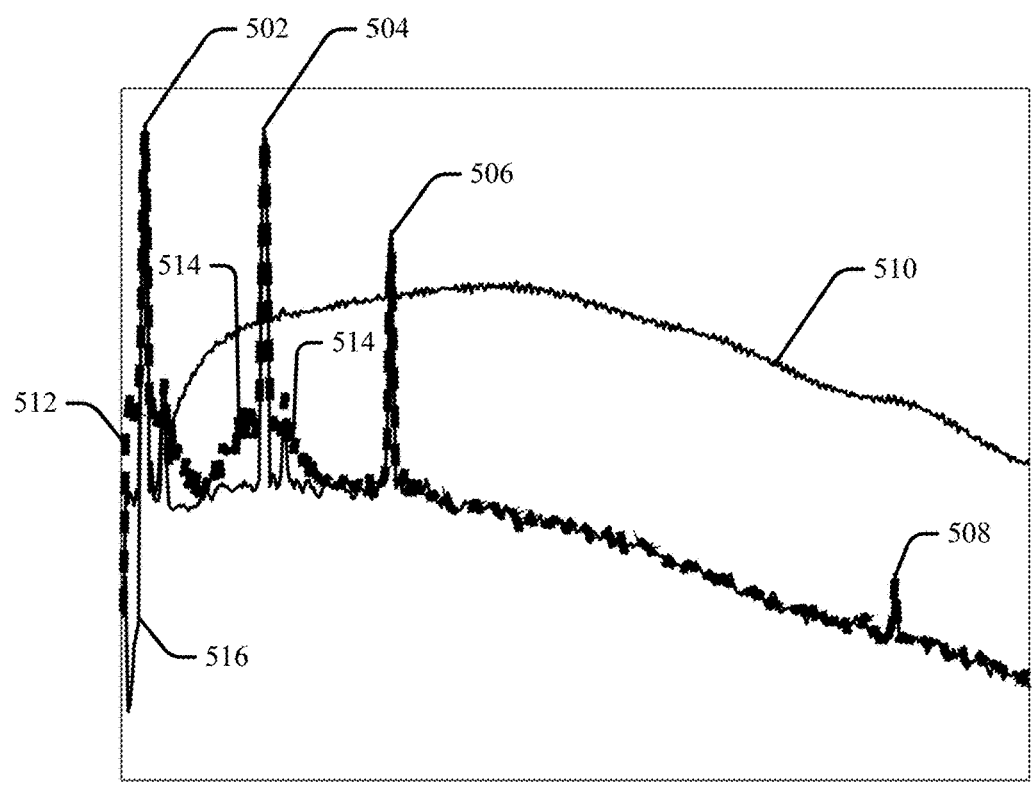
FIG. 5 illustrates an example of frequency spectrums of a beat signal without mitigation, a beat signal with zero-forcing mitigation, and a beat signal with radar interference mitigation using signal pattern matching, in accordance with techniques of this disclosure.

FIG. 5 illustrates an example 500 of frequency spectrums of a beat signal 510 without mitigation, a beat signal 512 with zero-forcing mitigation, and a beat signal 516 with radar interference mitigation using signal pattern matching, in accordance with techniques of this disclosure.

In the example 500, targets 502, 504, 506, and 508 are present in an environment. An unmitigated beat signal 510 may have a frequency spectrum with a noise floor that is greater than a signal reflected from the target 508. In this case, the unmitigated radar signal may not detect the target 508. A dashed line represents a beat signal 512 with zero-forcing mitigation. Due to the zero-forcing techniques, the beat signal 512 may have spectrum-spreading characteristics 514. The spectrum-spreading characteristics may cause false detections. The beat signal 516 is an example of the mitigated signal output from the preprocessing sub-module 216, and is represented by a solid line. In the example 500, the beat signal 516 has a similar noise floor as the beat signal 512 but lacks any spectrum-spreading characteristics similar to the spectrum-spreading characteristics 514. Due to spectrum-spreading being minimized, the beat signal 516 may be more sensitive resulting in improved quality of radar data inferred from the beat signal 516 generated by the radar system 104, compared to the resulting output from other radar systems that fail to mitigate, or mitigate interference in other ways.

Example Methods

Figure 6:
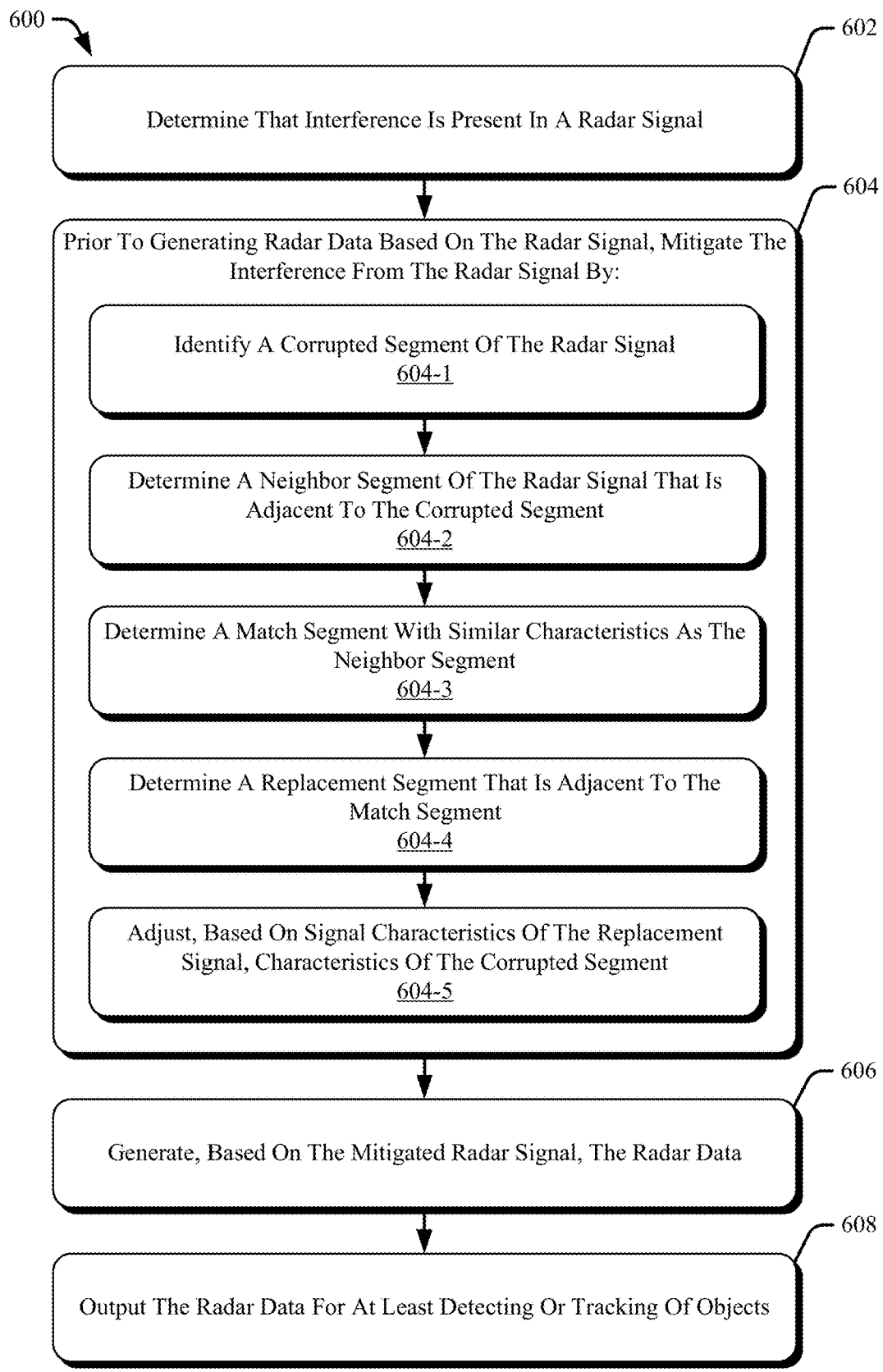
FIG. 6 illustrates an example method for radar interference mitigation using signal pattern matching, in accordance with techniques of this disclosure.

FIG. 6 illustrates example methods 600 for radar interference mitigation using signal pattern matching, in accordance with techniques of this disclosure. The operations (or steps) 602 through 608 are performed but are not necessarily limited to the order or combinations in which the operations are shown herein. Further, any of one or more of the operations may be repeated, combined, or reorganized to provide other operations. As one example, the radar system 104, the radar tracking module 108, the preprocessing sub-module 216, and/or the object-tracking sub-module 218 may perform the operations 602 through 608 based on instructions stored on the CRM 214 and executed by the processor 212.

At step 602, interference is determined, by a processor of a radar system, to be present in a radar signal. The radar signal is transmitted, and after being reflected off of an object, is received by the radar system. The interference may be induced into the radar signal from other radar signals transmitted from radar systems in the environment. There is a higher probability that interference may be induced as the quantity of other radar systems in the environment increases.

At step 604, prior to generating radar data based on the radar signal, one or more preprocessing steps (e.g., steps 604-1 to 604-5) may be executed to mitigate the interference from the radar signal. At 604-1, a corrupted segment of the radar signal, corresponding to the interference, is identified. In some aspects, multiple corrupted segments can be identified. In some implementations, the corrupted segment may be identified by applying adaptive thresholding over the magnitude (or the squared magnitude) of the radar signal to determine a threshold. A segment of the radar system may be considered corrupted if the magnitude (or squared magnitude) of the radar signal is greater than the threshold.

At step 604-2, a neighbor segment of the radar signal, adjacent to the corrupted segment, is determined. The neighbor segment may either precede or follow the corrupted segment (e.g., in a time domain). In some implementations, a trained model may be utilized to analyze parts of the radar signal that immediately precede and follow the corrupted segment to identify the neighbor segment to be used for identifying the corrupted segment. The trained model may be a neural network or other model trained using machine-learning to learn to identify corrupted segments and neighbor segments from which to identify a suitable match segment.

At step 604-3, a match segment of the radar signal with similar signal characteristics as the neighbor segment is determined. The radar signal may be analyzed for possible match segments with signal characteristics that highly correlate to the signal characteristics of the neighbor segment. In some aspects, a mean absolute error can be determined between a possible match segment and the neighbor segment. If the mean absolute error is below a threshold, the possible match segment is defined as the match segment. In other aspects, a correlation coefficient, between the neighbor segment and the possible match segment, can be determined. If the correlation coefficient is above a threshold, the possible match segment is defined as the match segment.

At step 604-4, a replacement segment of the radar signal that is adjacent to the match segment is determined. In some aspects, the replacement segment may either precede or follow the match segment corresponding to whether the neighbor segment precedes or follows the corrupted segment. That is, if the neighbor segment precedes the corrupted segment, then the replacement segment follows the match segment. Similarly, if the neighbor segment follows the corrupted segment, then the replacement segment precedes the match segment.

At step 604-5, the signal characteristics of the corrupted segment are adjusted based on the replacement signal. In some aspects, the adjustment is based on how well the match segment correlates to the neighbor segment.

In one example, if the match segment and the neighbor segment have a correlation coefficient that is greater than a threshold, then the signal characteristics of the replacement segment are used to adjust the signal characteristics of the corrupted segment. Otherwise, another method, such as zero forcing, can be used to adjust the corrupted segment. In this non-limiting example, the threshold used to determine if the signal characteristics of the replacement segment will be used to adjust the signal characteristics of the corrupted segment may be the same threshold used to determine whether the possible match segment gets defined as the match segment. In another example, the threshold used to determine if the signal characteristics of the replacement segment that is used to adjust the signal characteristics of the corrupted segment may be greater than the threshold used to determine whether the possible match segment gets defined as the match segment. Other combinations of thresholds and filtering may be used to identify the match segment.

At step 606, the radar data is generated based on the mitigated radar signal. Once the preprocessing steps are complete, the mitigated radar signal can be processed to obtain radar data concerning objects in the environment of the radar system. The mitigated radar signal generated, according to these steps thus far, may appreciate a lower noise floor than traditional mitigation methods and result in fewer false positives.

At step 608, the radar data is outputted for at least detecting and tracking of objects in the environment of the radar system. For example, if the radar system is equipped on a vehicle, the radar data may be used to detect and track objects in the path of the vehicle. Because the radar data may include fewer false positives than radar data generated by traditional means, the radar data may be more accurate and result in a safer user experience for a user of the vehicle.

Additional Examples

Example 1: A method comprising: determining, by a processor of a radar system, that interference is present in a radar signal; prior to generating radar data based on the radar signal, mitigating the interference from the radar signal by: identifying a corrupted segment of the radar signal that corresponds to the interference; determining a neighbor segment of the radar signal that is adjacent to the corrupted segment; determining a match segment of the radar signal with similar signal characteristics as the neighbor segment; determining a replacement segment of the radar signal that is adjacent to the match segment; and adjusting, based on signal characteristics of the replacement segment, signal characteristics of the corrupted segment of the radar signal to generate a mitigated radar signal without the interference; and generating, based on the mitigated radar signal, the radar data; and outputting the radar data for at least detecting or tracking of objects in an environment of the radar system.

Example 2: The method of example 1, wherein identifying the corrupted segment of the radar signal that corresponds to the interference comprises: applying adaptive thresholding over at least one of a magnitude of the radar signal or a squared magnitude of the radar signal to determine a threshold; and responsive to a segment of the at least one of the magnitude of the radar signal or the squared magnitude of the radar signal being greater than the threshold, identifying the corrupted segment of the radar signal as the segment that is greater than the threshold.

Example 3: The method of any of the preceding examples, wherein determining the neighbor segment of the radar signal that is adjacent to the corrupted segment further comprises: utilizing a trained model to analyze parts of the radar signal that immediately precede and immediately follow the corrupted segment to identify the neighbor segment to be used for identifying the match segment.

Example 4: The method of any of the preceding examples, wherein determining the match segment of the radar signal with similar signal characteristics as the neighbor segment comprises: determining a mean absolute error between a possible match segment and the neighbor segment; and responsive to the mean absolute error between the possible match segment and the neighbor segment being below a threshold, defining the possible match segment as the match segment with similar signal characteristics as the neighbor segment.

Example 5: The method of any of the preceding examples, wherein determining the match segment of the radar signal with similar signal characteristics as the neighbor segment comprises: determining a correlation coefficient between a possible match segment and the neighbor segment; and responsive to the correlation coefficient between the possible match segment and the neighbor segment being above a first threshold, defining the possible match segment as the match segment with similar signal characteristics as the neighbor segment.

Example 6: The method of example 5, wherein mitigating the interference from the radar signal further comprises: determining whether the correlation coefficient between the neighbor segment and the match segment is above a second threshold; and responsive to determining that the correlation coefficient is above the second threshold, adjusting the signal characteristics of the corrupted segment of the radar signal to generate the mitigated radar signal by replacing signal characteristics of the corrupted segment with signal characteristics of the replacement segment.

Example 7: The method of example 5, wherein mitigating the interference from the radar signal further comprises: determining whether the correlation coefficient between the neighbor segment and the match segment is below a second threshold; and responsive to determining that the correlation coefficient is below the second threshold, adjusting signal characteristics of the corrupted segment of the radar signal by applying a zero-forcing function to signal characteristics of the corrupted segment.

Example 8: The method of any of the preceding examples, wherein: the neighbor segment precedes the corrupted segment of the radar signal; and the replacement segment follows the match segment of the radar signal.

Example 9: The method of any of the preceding examples, wherein: the neighbor segment follows the corrupted segment of the radar signal; and the replacement segment precedes the match segment of the radar signal.

Example 10: A system comprising: a processor configured to: determine that interference is present in a radar signal; prior to generating radar data based on the radar signal, mitigate the interference from the radar signal by: identifying a corrupted segment of the radar signal that corresponds to the interference; determining a neighbor segment of the radar signal that is adjacent to the corrupted segment; determining a match segment of the radar signal with similar signal characteristics as the neighbor segment; responsive to identifying the match segment, determining a replacement segment of the radar signal that is adjacent to the match segment; and adjusting, based on signal characteristics of the replacement segment, signal characteristics of the corrupted segment of the radar signal to generate a mitigated radar signal without the interference; and generating, based on the mitigated radar signal, the radar data; and outputting the radar data for at least detecting or tracking of objects in an environment of a radar system.

Example 11: The system of example 10, wherein a processor is further configured to identify the corrupted segment of the radar signal that corresponds to the interference by at least: applying adaptive thresholding over at least one of a magnitude of the radar signal or a squared magnitude of the radar signal to determine a threshold; and responsive to a segment of the at least one of the magnitude of the radar signal or the squared magnitude of the radar signal being greater than the threshold, identifying the corrupted segment of the radar signal that corresponds to the interference as the segment that is greater than the threshold.

Example 12: The system of any of the examples 10 or 11, wherein the processor is configured to determine the neighbor segment of the radar signal that is adjacent to the corrupted segment by at least: utilizing a model trained to analyze parts of the radar signal that immediately precede and immediately follow the corrupted segment to identify the neighbor segment to be used for identifying the match segment.

Example 13: The system of any of the examples 10 to 12, wherein the processor is configured to determine the match segment of the radar signal with similar signal characteristics as the neighbor segment by at least: determining a mean absolute error between a possible match segment and the neighbor segment; and responsive to the mean absolute error between the possible match segment and the neighbor segment being below a threshold, defining the possible match segment as the match segment with similar signal characteristics as the neighbor segment.

Example 14: The system of any of the examples 10 to 13, wherein the processor is configured to determine the match segment of the radar signal with similar signal characteristics as the neighbor segment by at least: determining a correlation coefficient between a possible match segment and the neighbor segment; and responsive to the correlation coefficient between the possible match segment and the neighbor segment being above a first threshold, defining the possible match segment as the match segment with similar signal characteristics as the neighbor segment.

Example 15: The system of example 14, wherein the processor is further configured to mitigate the interference from the radar signal by at least: determining whether the correlation coefficient between the neighbor segment and the match segment is above a second threshold; and responsive to determining that the correlation coefficient is above the second threshold, adjusting the signal characteristics of the corrupted segment of the radar signal to generate the mitigated radar signal by replacing signal characteristics of the corrupted segment with signal characteristics of the replacement segment.

Example 16: The system of example 14, wherein the processor is further configured to mitigate the interference from the radar signal by at least: determining whether the correlation coefficient between the neighbor segment and the match segment is below a second threshold; and responsive to determining that the correlation coefficient is below the second threshold, adjusting signal characteristics of the corrupted segment of the radar signal by applying a zero-forcing function to signal characteristics of the corrupted segment.

Example 17: The system of any of the examples 10 to 16, wherein: the neighbor segment precedes the corrupted segment of the radar signal; and the replacement segment follows the match segment of the radar signal.

Example 18: The system of any of the examples 10 to 17, wherein: the neighbor segment follows the corrupted segment of the radar signal; and the replacement segment precedes the match segment of the radar signal.

Example 19: The system of any of the examples 10 to 18, wherein: the system is part of an automotive system.

Example 20: A computer-readable storage medium comprising instructions that, when executed, configure at least one processor to: determine that interference is present in a radar signal; prior to generating radar data based on the radar signal, mitigate the interference from the radar signal by: identifying a corrupted segment of the radar signal that corresponds to the interference; determining a neighbor segment of the radar signal that either precedes or follows the corrupted segment; determining a match segment of the radar signal with similar signal characteristics as the neighbor segment; responsive to identifying the match segment, determining a replacement segment of the radar signal that either precedes or follows the match segment; and adjusting, based on signal characteristics of the replacement segment, signal characteristics of the corrupted segment of the radar signal to generate a mitigated radar signal without the interference; and generating, based on the mitigated radar signal, the radar data; and outputting the radar data for at least detecting or tracking of objects in an environment of a radar system.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with radar interference mitigation can occur in other systems. Therefore, although described as a way to improve radar interference mitigation in vehicles based radars, the techniques of the foregoing description can be applied to other systems that need to mitigate electromagnetic interference. Additionally, the techniques herein have been described in the context of digital signal processing. Theoretically, similar techniques can be applied using analog signal processing.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   determining, by a processor of a radar system, that interference is present in a radar signal;
   prior to generating radar data based on the radar signal, mitigating the interference from the radar signal by:
   identifying a corrupted segment of the radar signal that corresponds to the interference;
   determining a neighbor segment of the radar signal that is adjacent to the corrupted segment;
   determining a match segment of the radar signal with similar signal characteristics as the neighbor segment;
   determining a replacement segment of the radar signal that is adjacent to the match segment; and
   adjusting, based on signal characteristics of the replacement segment, signal characteristics of the corrupted segment of the radar signal to generate a mitigated radar signal without the interference; and
   generating, based on the mitigated radar signal, the radar data; and
   outputting the radar data for at least detecting or tracking of objects in an environment of the radar system.

2. The method of claim 1, wherein identifying the corrupted segment of the radar signal that corresponds to the interference comprises:
   applying adaptive thresholding over at least one of a magnitude of the radar signal or a squared magnitude of the radar signal to determine a threshold; and
   responsive to a segment of the at least one of the magnitude of the radar signal or the squared magnitude of the radar signal being greater than the threshold, identifying the corrupted segment of the radar signal as the segment that is greater than the threshold.

3. The method of claim 1, wherein determining the neighbor segment of the radar signal that is adjacent to the corrupted segment further comprises:
   utilizing a trained model to analyze parts of the radar signal that immediately precede and immediately follow the corrupted segment to identify the neighbor segment to be used for identifying the match segment.

4. The method of claim 1, wherein determining the match segment of the radar signal with similar signal characteristics as the neighbor segment comprises:
   determining a mean absolute error between a possible match segment and the neighbor segment; and
   responsive to the mean absolute error between the possible match segment and the neighbor segment being below a threshold, defining the possible match segment as the match segment with similar signal characteristics as the neighbor segment.

5. The method of claim 1, wherein determining the match segment of the radar signal with similar signal characteristics as the neighbor segment comprises:
   determining a correlation coefficient between a possible match segment and the neighbor segment; and
   responsive to the correlation coefficient between the possible match segment and the neighbor segment being above a first threshold, defining the possible match segment as the match segment with similar signal characteristics as the neighbor segment.

6. The method of claim 5, wherein mitigating the interference from the radar signal further comprises:
   determining whether the correlation coefficient between the neighbor segment and the match segment is above a second threshold; and
   responsive to determining that the correlation coefficient is above the second threshold, adjusting the signal characteristics of the corrupted segment of the radar signal to generate the mitigated radar signal by replacing signal characteristics of the corrupted segment with signal characteristics of the replacement segment.

7. The method of claim 5, wherein mitigating the interference from the radar signal further comprises:
   determining whether the correlation coefficient between the neighbor segment and the match segment is below a second threshold; and
   responsive to determining that the correlation coefficient is below the second threshold, adjusting signal characteristics of the corrupted segment of the radar signal by applying a zero-forcing function to signal characteristics of the corrupted segment.

8. The method of claim 1, wherein:
   the neighbor segment precedes the corrupted segment of the radar signal; and
   the replacement segment follows the match segment of the radar signal.

9. The method of claim 1, wherein:
   the neighbor segment follows the corrupted segment of the radar signal; and
   the replacement segment precedes the match segment of the radar signal.

10. The method of claim 1, wherein the radar signal is a single beat signal.

11. The method of claim 1, further comprising analyzing the radar signal to find the match segment having similar signal characteristics as the neighbor segment of the corrupt segment.

12. A system comprising:
    a processor configured to:
    determine that interference is present in a radar signal;
    prior to generating radar data based on the radar signal, mitigate the interference from the radar signal by:
    identifying a corrupted segment of the radar signal that corresponds to the interference;
    determining a neighbor segment of the radar signal that is adjacent to the corrupted segment;
    determining a match segment of the radar signal with similar signal characteristics as the neighbor segment;
    responsive to identifying the match segment, determining a replacement segment of the radar signal that is adjacent to the match segment; and
    adjusting, based on signal characteristics of the replacement segment, signal characteristics of the corrupted segment of the radar signal to generate a mitigated radar signal without the interference; and
    generating, based on the mitigated radar signal, the radar data; and
    outputting the radar data for at least detecting or tracking of objects in an environment of a radar system.

13. The system of claim 12, wherein the processor is further configured to identify the corrupted segment of the radar signal that corresponds to the interference by at least:
    applying adaptive thresholding over at least one of a magnitude of the radar signal or a squared magnitude of the radar signal to determine a threshold; and responsive to a segment of the at least one of the magnitude of the radar signal or the squared magnitude of the radar signal being greater than the threshold, identifying the corrupted segment of the radar signal that corresponds to the interference as the segment that is greater than the threshold.

14. The system of claim 12, wherein the processor is configured to determine the neighbor segment of the radar signal that is adjacent to the corrupted segment by at least:
utilizing a trained model to analyze parts of the radar signal that immediately precede and immediately follow the corrupted segment to identify the neighbor segment to be used for identifying the match segment.

15. The system of claim 12, wherein the processor is configured to determine the match segment of the radar signal with similar signal characteristics as the neighbor segment by at least:
determining a mean absolute error between a possible match segment and the neighbor segment; and
responsive to the mean absolute error between the possible match segment and the neighbor segment being below a threshold, defining the possible match segment as the match segment with similar signal characteristics as the neighbor segment.

16. The system of claim 12, wherein the processor is configured to determine the match segment of the radar signal with similar signal characteristics as the neighbor segment by at least:
determining a correlation coefficient between a possible match segment and the neighbor segment; and
responsive to the correlation coefficient between the possible match segment and the neighbor segment being above a first threshold, defining the possible match segment as the match segment with similar signal characteristics as the neighbor segment.

17. The system of claim 16, wherein the processor is further configured to mitigate the interference from the radar signal by at least:
determining whether the correlation coefficient between the neighbor segment and the match segment is above a second threshold; and
responsive to determining that the correlation coefficient is above the second threshold, adjusting the signal characteristics of the corrupted segment of the radar signal to generate the mitigated radar signal by replacing signal characteristics of the corrupted segment with signal characteristics of the replacement segment.

18. The system of claim 16, wherein the processor is further configured to mitigate the interference from the radar signal by at least:
determining whether the correlation coefficient between the neighbor segment and the match segment is below a second threshold; and
responsive to determining that the correlation coefficient is below the second threshold, adjusting signal characteristics of the corrupted segment of the radar signal by applying a zero-forcing function to signal characteristics of the corrupted segment.

19. The system of claim 12, wherein:
the neighbor segment precedes the corrupted segment of the radar signal; and
the replacement segment follows the match segment of the radar signal.

20. The system of claim 12, wherein:
the neighbor segment follows the corrupted segment of the radar signal; and
the replacement segment precedes the match segment of the radar signal.

21. The system of claim 12, wherein the system is part of an automotive system.

22. A non-transitory_computer-readable storage medium storing instructions executable by at least one processor to:
determine that interference is present in a radar signal;
prior to generating radar data based on the radar signal, mitigate the interference from the radar signal by:
identifying a corrupted segment of the radar signal that corresponds to the interference;
determining a neighbor segment of the radar signal that either precedes or follows the corrupted segment;
determining a match segment of the radar signal with similar signal characteristics as the neighbor segment;
responsive to identifying the match segment, determining a replacement segment of the radar signal that either precedes or follows the match segment; and
adjusting, based on signal characteristics of the replacement segment, signal characteristics of the corrupted segment of the radar signal to generate a mitigated radar signal without the interference; and
generating, based on the mitigated radar signal, the radar data; and
outputting the radar data for at least detecting or tracking of objects in an environment of a radar system.

\* \* \* \* \*